United States Patent [19]

Strazik et al.

[11] 4,280,938
[45] Jul. 28, 1981

[54] HIGH SOLIDS AIR-DRYING COATING COMPOSITIONS

[75] Inventors: William F. Strazik; John R. LeBlanc, both of Wilbraham; J. Owen Santer, East Longmeadow, all of Mass.

[73] Assignee: Monsanto Company, St. Louis, Mo.

[21] Appl. No.: 105,058

[22] Filed: Dec. 19, 1979

[51] Int. Cl.$^3$ ................................................ C08L 91/00
[52] U.S. Cl. .................................. 260/21; 260/18 PF; 260/22 CA; 260/22 CQ; 427/385.5; 427/386; 427/388.3; 428/413; 428/418; 428/458; 428/461; 428/463; 428/480; 428/482; 428/500; 428/522; 428/524
[58] Field of Search ............... 428/413, 418, 458, 461, 428/462, 463, 480, 482, 500, 520, 523, 524; 260/21, 22 CQ, 18 PF, 22 CB; 525/157, 374, 518; 427/386, 385.5, 388.3

[56] References Cited

U.S. PATENT DOCUMENTS

| 2,764,574 | 9/1956 | Widmer et al. ............... 260/21 X |
| 2,829,119 | 4/1958 | Dudley et al. . |
| 2,885,382 | 5/1959 | Zuppinger et al. ......... 260/22 CQ X |
| 2,986,541 | 5/1961 | Zuppinger et al. ............... 260/21 |
| 3,020,255 | 2/1962 | Magrane et al. . |
| 3,371,067 | 2/1968 | Anderson . |
| 3,535,148 | 10/1970 | Ravve ........................ 525/518 X |
| 3,830,782 | 8/1974 | Kempter et al. .............. 260/21 X |
| 3,839,289 | 10/1974 | Waitkus ..................... 260/29.4 R X |
| 3,887,637 | 6/1975 | Waitkus ..................... 260/29.4 R X |

FOREIGN PATENT DOCUMENTS

| 9633759 | 11/1964 | France . |
| 726661 | 6/1957 | United Kingdom . |
| 779232 | 7/1957 | United Kingdom ............... 525/518 |

*Primary Examiner*—Ronald H. Smith
*Assistant Examiner*—Thurman K. Page
*Attorney, Agent, or Firm*—R. Bruce Blance; William J. Farrington; Edward P. Grattan

[57] ABSTRACT

Air drying compositions comprising an unsaturated oil modified resin and an unsaturated condensate of an alkoxy-methylmelamine, an allylic alcohol and an acrylamide. The unsaturated melamine condensate contains allylic and acrylamide moieties in the ratio of about 3:1 to about 1:3, at least about 0.75 allylic moieties and no more than about 3 acrylamide moieties per melamine ring and a total of allylic and acrylamide moieties in the range of about 2 to about 4 per melamine ring.

25 Claims, No Drawings

HIGH SOLIDS AIR-DRYING COATING COMPOSITIONS

This invention relates to high solids air-drying compositions comprising an unsaturated oil-modified resin of moderate molecular weight and an unsaturated condensate of an alkoxymethylmelamine, an allylic alcohol and an acrylamide. More particularly it is directed to high solids air-drying compositions comprising an unsaturated oil modified resin of moderate molecular weight and an unsaturated condensate of an alkoxymethylmelamine, allyl alcohol and acrylamide.

Anti-pollution legislation has caused the coatings industry to seek high solids coatings. Alkyd manufacturers have tried to increase the solids/viscosity ratio of their products by reducing the molecular weight of the alkyd. While this approach has been successful in raising the solids of air dry alkyd paints, it has produced some undesirable side effects in the resulting coatings; namely, lower hardness, solvent resistance and water resistance, and longer tack free and cure times. The use of conventional aminoplast crosslinkers fails to improve these properties in air dry alkyd coatings.

The present invention provides an air-drying composition comprising from 50 to 90 parts by weight of an unsaturated oil modified resin and from 10 to 50 parts by weight of an unsaturated condensate of an alkoxymethylmelamine, an allylic alcohol and an acrylamide wherein the ratio of allylic moieties to acrylamide moieties is in the range of about 3:1 to about 1:3, wherein there is at least about 0.75 allylic moieties and no more than about 3 acrylamide moieties per melamine ring and wherein the total of allylic moieties and acrylamide moieties is in the range of about 2 to about 4 per melamine ring. Another aspect of the invention is directed to articles coated with the air-drying compositions compromising unsaturated oil-modified resins and unsaturated melamine condensates.

The alkoxymethylmelamine is methylolated, etherified melamine obtained by reaction of formaldehyde and melamine under conditions well known in the art to minimize the amount of oligomerization which can occur when methylene or methylene ether bridges are formed by intercondensation of methylol groups, followed by etherification with an alcohol or mixture of alcohols. The combined ratio of formaldehyde to melamine in the alkoxymethyl melamine is in the range of about 5:1 to about 6:1 and the combined ratio of the etherifying alcohol is in the range of about 4.7 to about 6.0 moles per mole of melamine. The etherifying alcohol is selected from the group consisting of methyl, ethyl and isopropyl alcohols, and mixtures thereof and mixtures with higher alcohols containing up to 10 carbon atoms. However the amount of methoxy, ethoxy or isopropoxy groups should at least be stoichiometric with the allylic alcohol and acrylamide condensing agents to allow ready displacement of alkoxy by the allylic and acrylamide groups. The preferred etherifying alcohol is methyl alcohol because its volatility and low boiling point allow its more ready displacement from the alkoxymethylmelamine. The average degree of oligomerization of the alkoxymethylmelamine is three or less and is preferably less than two.

The acrylamide which is condensed with the alkoxymethylmelamine can be represented by the formula:

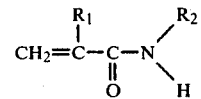

where $R_1$ and $R_2$ are selected from the group consisting of H and methyl. The preferred acrylamide is acrylamide.

The allylic alcohol which is condensed with the alkoxymethylmelamine can be represented by the formula:

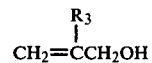

where $R_3$ is hydrogen or a $C_1$ to $C_4$ alkyl group. The preferred allylic alcohols are allyl alcohol and methallyl alcohol.

The ratio of allylic moieties to acrylamide moieties in the unsaturated melamine condensate is in the range of about 3:1 to about 1:3 so that when the unsaturated melamine condensate is incorporated into unsaturated alkyds it can reduce the viscosity of the system without substantially increasing the time required by the system to reach a tack-free state when it is allowed to dry in air. In general the allylic moieties promote a reduction in viscosity of the system, the acrylamide moieties enhance the hardness of the air-dried coating and the acrylamide and allylic moieties together enhance the drying properties. There should be at least about 0.75 allylic moieties in the unsaturated melamine condensate and no more than about 3 acrylamide moieties and the total of allylic moieties and acrylamide moieties should be in the range of about 2 to about 4.5 per melamine ring. More preferably the number of allylic moieties per melamine ring is in the range of about 1 to about 3 and the number of acrylamide moieties per melamine ring is in the range of about 1 to about 2 to provide a balance of viscosity reduction and rate of air-drying to an unsaturated alkyd system and even more preferably the number of allylic moieties is in the range of about 1.5 to about 2.5 and the number of acrylamide moieties is in the range of about 1 to about 2.

The unsaturated melamine condensate of the present invention can be prepared by the stepwise reaction of the allylic alcohol and the acrylamide or the acrylamide and the allylic alcohol with the alkoxymethylmelamine. Preferably the acrylamide is reacted in a first step with the alkoxymethylmelamine and the allylic alcohol is reacted in a second step. If the allylic alcohol is reacted in a first step, reaction of the acrylamide in the second step causes some of the allylic alcohol to be displaced by the acrylamide during the reaction, reducing the efficiency of the reaction and tending to form high molecular weight materials. When the acrylamide is reacted in the first step, no displacement of the acrylamide by the allylic alcohol is observed in the second step. An undesirable method of carrying out the reaction is realized when the alkoxymethylmelamine is reacted simultaneously with a mixture of the allylic alcohol and the acrylamide instead of by stepwise reaction. Unexpectedly, an acrylamide by-product is formed and gelation of the unsaturated melamine tends to occur.

In the reaction of the acrylamide with the alkoxymethylmelamine, the temperature is maintained below about 120° C. to minimize polymerization reactions and in the initial stage of the reaction the temperature is preferably maintained below about 90° C. while the methanol generated by the condensation reaction is removed under reduced pressure. In the second stage of the reaction, an excess of allylic alcohol is added to the alkoxymethylmelamine/acrylamide condensation product and the temperature is gradually increased in the range of about 80° to about 110° C. while the methanol reaction product is slowly distilled at atmospheric pressure through a multiplate distillation column. When the desired degree of replacement of methyl with allylic groups has occurred the reaction medium is distilled under reduced pressure to remove residual methanol and unreacted allylic alcohol. It is then convenient to add a small quantity of a suitable solvent to the melamine condensate to inhibit a tendency to crystallize which can occur particularly with condensate containing higher levels of acrylamide groups.

The reaction of the alkoxymethylmelamine and the acrylamide is carried out in the presence of a catalytic amount of an acid catalyst selected from the group consisting of protonic acids of pKa less than about 2 and Lewis acids. A catalytic amount is an amount which allows the reaction to be completed within a reasonable time, usually less than 24 hours at a selected temperature. The catalyst is generally added in an amount of from about 0.1 to about 5 weight percent, preferably from about 0.5 to about 2 weight percent of the reaction mixture. The protonic acids can be selected from the mineral acids hydrochloric, nitric and sulfuric acids, organic acids such as formic acids and oxalic acid, and sulfonic acids such as methane sulfonic acid, trifluoromethane sulfonic acid, benzene sulfonic acid and p-toluenesulfonic acid. The sulfonic acids are generally preferred since they are strong acids, readily soluble in the reaction medium and can be readily added without the addition of water. The Lewis acids can be selected from the group consisting of metal halides such as stannic chloride, aluminum chloride, ferric chloride and magnesium bromide, metal alkoxides such as aluminum isopropoxide, tetrapropyl titanate, tetrabutyl zirconate, and dipropyl diacetonyl titanate, metal salts of organic acids such as stannous octoate, stannic octoate and dibutyl tin diacetate, and boron compounds such as boron trichloride, boron trifluoride and boron trifluoride etherate. For high conversion, boron trifluoride, aluminum chloride and stannic chloride are among the preferred Lewis acids.

To prevent premature polymerization of the unsaturated melamine condensate or the acrylamide during the condensation reaction, a polymerization inhibiting quantity of an inhibitor of free radical polymerization is added to the reaction mixtures. Excess of inhibitor should be avoided since it can inhibit the polymerization of air-drying unsaturated oil-modified resins containing the unsaturated melamine condensate of the present invention, causing an excessively long induction period when the compositions are air-dried. Effective inhibitors include hydroquinone, ethers of hydroquinone, and quinone.

The unsaturated melamine condensates can be used with unsaturated vehicles to reduce the viscosity of coating systems containing such vehicles, and to improve the drying properties and hardness of the coatings. The condensates are especially useful with air-drying unsaturated or oil-modified resins of number average molecular weight about 10,000 or less and glass transition temperature in the range of about 0° to about 100° C. having an oil length in the range of about 15 to about 50%. The oil modified resins can be oil modified alkyd resins prepared from conventional polybasic acids, polyhydric alcohols and oil-modifying fatty acids, or oil-modified styrene allyl alcohol copolymers prepared by esterification of styrene allyl alcohol copolymers containing from about 2 to about 10 hydroxy groups per molecule with oil modifying fatty acid, or oil modified acrylic resins prepared by esterification of oil modifying fatty acid and low molecular weight hydroxy containing acrylic copolymers of glass transition temperature of about 25° C. or higher prepared by interpolymerization of $C_4$ to $C_7$ alkyl acrylates or $C_5$ to $C_8$ alkyl methacrylates with a hydroxy monomer selected from the group consisting of allyl alcohol, methallyl alcohol, and $C_5$ to $C_8$ hydroxy acrylates or hydroxy methacrylates such as 2-hydroxyethyl acrylate and 2-hydroxyethyl methacrylate, or oil-modified epoxy resins prepared by reaction of an oil-modifying fatty acid with an epoxy resin condensate of the diglycidyl ether of bisphenol A or an epoxidized polybutadiene. Preferred oil-modified resins are of number average molecular weight in the range of about 500 to about 8000, and glass transition temperature in the range of about 20° to about 60° C. and contain an oil modifying fatty acid comprising at least about 60 percent by weight of a polyunsaturated fatty acid such as linoleic or linolenic acid.

It is desirable that the oil or fatty acid modifying agent should contain at least 60% by weight, preferably at least 80% by weight, of a polyunsaturated fatty acid such as linoleic acid or linolenic acid, based on the total fatty acid content. Accordingly, the fatty acids which may be used in the present invention are fatty acids separated from drying oils or semi-drying oils such as dehydrated castor oil fatty acid (a linoleic acid content of 76 to 88%), linseed oil fatty acid (a linoleic acid content of 15% and a linolenic acid content of 52%) and safflower oil fatty acid (a linoleic acid content of 72 to 80%) as well as linoleic acid, linolenic acid and a mixture of the both. In the preparation of the oil-modified resins it is generally desirable to add a sufficient amount of a polymerization inhibitor such as hydroquinone to inhibit gelation during the reaction.

Unsaturated oil modified resin compositions in combination with the unsaturated melamine condensates can contain from about 50 to about 90 parts by weight of the unsaturated oil-modified resin and from about 50 to 10 parts by weight of the unsaturated melamine condensate. Preferably the combination contains from about 70 to about 90 parts by weight of the unsaturated oil-modified resin and from about 30 to about 10 parts by weight of unsaturated melamine condensate. Too high levels of the unsaturated melamine condensate can cause longer times to reach a tack-free condition and deterioration of properties such as flexibility in the cured coating especially when the condensate contains high levels of acrylamide. When the level is too low no appreciable effect on the viscosity of the coating composition and the hardness and solvent resistance of the coating is obtained.

The air-drying compositions of the present invention comprising unsaturated alkyds and unsaturated melamine condensates may be formulated in any of the conventional solvents for such systems including aromatic hydrocarbons, aliphatic esters, and aliphatic ketones and mixtures thereof and mixtures containing aliphatic hydrocarbons. The solutions can be used at any dilution which is convenient for application of the coating compositions to a substrate. Preferably the solids of the coating compositions are greater than 50 weight percent and even more preferably 70 percent or greater since advantage can be taken of the ability of the unsaturated melamine condensate to reduce the viscosity of higher molecular weight unsaturated oil-modified resin.

The air-drying compositions containing unsaturated oil-modified resins and the unsaturated melamine condensates may be cured at room temperature by means of metal dryers of heavy metals such as cobalt, manganese and zinc salts of naphthenic acid, neodecanoic acid and the like or by means of such metal dryers in combination with the alkali metal salts of these acids. When the coating compositions are used as room-temperature drying paints, they are suitable for painting outdoor structures, and heavy machinery and equipment too bulky to be passed through drying ovens.

The unsaturated air-drying compositions may also be force-dried and cured at elevated temperatures of up to about 100° C. and more and such cure may be accelerated by conventional free radical catalysts such as peroxides and hydroperoxides and by redox systems such as benzoyl peroxide and dimethylaniline.

The coating compositions can be modified by the addition of pigments, plasticizers, colorants, dyes, pigment dispersing agents, flow control agents, stabilizers and the like.

Other types of unsaturated vehicles which may be usefully combined with the unsaturated melamine condensates are polyesters containing internal unsaturation derived from maleic acid moieties and the like and pendant unsaturation provided by allylic or acrylic groups. Such polyester compositions are conveniently cured by free radical methods at elevated temperatures, and can include significant amounts of vinyl monomers such as acrylates, methacrylates and aromatic vinyl monomers such as styrene.

The following examples are set forth in illustration of the invention and should not be construed as a limitation thereof. Unless otherwise indicated, all parts and percentages are by weight.

EXAMPLE 1

This example describes the preparation of an unsaturated melamine condensate containing 1.5 acrylamide units and 1.5 allyl units per melamine ring.

To a kettle equipped with stirrer, thermometer, heating jacket and a vacuum outlet are charged the following:
  1024 parts Hexamethoxymethyl melamine
  300 parts Acrylamide
  3.24 parts Methane sulfonic acid
  0.60 parts Hydroquinone (0.2% by wt. on acrylamide)
  0.30 parts Quinone (0.1% by wt. on acrylamide)

The above are stirred as the temperature is increased to 80° C. At 80° C., a vacuum of 380 mm mercury is applied. The temperature and vacuum are slowly increased to 110° C. and 50 mm Hg Vac, respectively, until 99 percent of the acrylamide has reacted. This generally requires 3 hours from start to finish.

At this point, the temperature is reduced, the vacuum outlet is closed and the kettle is connected to a 10 plate Oldershaw fractionation column, and 488 parts allyl alcohol is added to the reaction product. The reaction temperature is gradually increased from 85° C. to 102° C. as 126 parts methanol corresponding to insertion of 1.5 allyl groups per melamine, is removed. At this point the reaction mixture is neutralized with 50% caustic (NaOH) and the unreacted allyl alcohol and any other volatiles are removed by vacuum distillation at 110° C. and 50 mm mercury vacuum. The product is cooled to about 80°–85° C. whereupon 2-butanone (methyl ethyl ketone) is added to produce a 78.4% by weight solids product. This product is filtered through a bed of Celite before use.

EXAMPLES 2–8

By the procedure of Example 1, the following examples containing different proportions of acrylamido moieties and allyl moieties are prepared from hexamethoxymethylmelamine, acrylamide and allyl alcohol.

TABLE 1

UNSATURATED MELAMINE CONDENSATES

| Example | Allyl groups per melamine ring | Acrylamide groups per melamine ring |
|---|---|---|
| 1 | 1.5 | 1.5 |
| 2 | 2.5 | 1.5 |
| 3 | 0.75 | 1.5 |
| 4 | 2 | 2 |
| 5 | 0 | 1.5 |
| 6 | 0 | 2 |
| 7 | 1 | 2 |
| 8 | 3 | 0 |

EXAMPLE 1A

An air-drying resin composition is prepared by blending 1200 parts by weight of a 70 percent xylene solution of an oil modified unsaturated resin (M.W. 6000, oil length 35), 268 parts of the unsaturated melamine condensate solution of Example 1, 6 parts of a 12% solution of cobalt neodecanoate, 12 parts 18% lithium drier sold by Tenneco Inc. under the tradename LTD drier and 32 parts of methyl ethyl ketone. The resulting mixture is stirred until a homogeneous product results. This formulation is 70% by weight total solids and contains an 80/20 w/w solid ratio of oil-modified unsaturated resin to unsaturated melamine condensate. The viscosity of this formulation is 2500 cps @25° C. The coating composition is applied to 0.64 mm Bonderite 37 steel panels and dried in air.

The following procedures are used to evaluate the coating composition:

Viscosity is determined by Brookfield Viscometer and Gardner-Holt Viscosity tube comparison at 25° C.

Formulation stability is determined by storing the formulations in clear Gardner-Holt viscosity tubes and/or in sealed 57 ml. jars (clear) at room temperature. The formulations are exposed to light and are periodically examined for any skin formation and/or viscosity change.

Coating thicknesses on steel panels are determined by means of a GE thickness Gage Type B Model A 337AY2.

Tack free times are determined in two ways:

(A) When the finger with a slight pressure will not leave a mark and the surface is not sticky to the touch.

(B) A strip of aluminum foil, approx. 19 mm × 76 mm, is smoothed and curled into a "C" shape by drawing the strip between a flat surface and a glass tube. One end of this curled foil strip is placed on the coating and held in place for 8 seconds with a 17 gram weight. If the foil rolls over when the weight is removed, the coating is judged tack free.

Coating hardness is determined by the standard pencil hardness testing procedure (ASTM D3363-74).

Solvent Resistance is determined by rubbing a felt tipped marker, the tip of which is saturated with methyl ethyl ketone, over the cured coating and determining the number of rubs necessary to penetrate or dissolve the coating, exposing the bare metal substrate. A single rub constitutes moving the MEK saturated marker across the coating and back over the same path to the starting point.

Water spot test. A pool of water, about 12 mm in diameter, is placed on the cured coating and covered with a watch glass. After 30 minutes at room temperature, the glass cover is removed, the water is removed, and the hardness of the exposed portion of the coating is immediately determined by the standard pencil hardness test described above. Any whitening or other changes in the film appearance (e.g. blistering, swelling, etc.) are also noted.

Coating flexibility is determined by means of the Gardner Falling Dart Impact Tester. Failure has occurred when the coating shows any sign of cracking or crazing.

Durability is determined by exposing coatings on steel substrates to the weatherability cycle of the QUV Accelerated Weathering Tester (Q-Panel Company). Each cycle consists of 8 hours of condensation at 60° C. followed by 16 hours of ultraviolet at 65° C.

Data from the evaluation of Example 1A are presented in Table 2.

EXAMPLES A-SERIES

Air-drying compositions are prepared from the unsaturated melamine condensates of examples 2-6 by the formulation of example 1A to provide a series of coating compositions containing unsaturated oil-modified resin and unsaturated melamine condensate in the weight ratio of 80 parts to 20 parts. Data for the evaluation of the coating compositions are presented in Table 2 along with data for Example 9A comprising the unsaturated resin without the unsaturated melamine condensate. The data show that the mixed unsaturates i.e. the melamine condensates containing both allyl and acrylamide units in Examples 1A, 2A, 3A and 4A cause significant decrease in viscosity of the coating system and improve the hardness, solvent resistance and water resistance of the coatings without adverse effect on the impact resistance and the tack free time while the unsaturates containing only acrylamide units have little effect on hardness, solvent resistance or water resistance and increase the tack free time substantially.

TABLE 2

Evaluation of Air-drying Unsaturated Compositions, A Series

| Sample Number | Example 1A | Example 2A | Example 3A | Example 4A | Example 5A | Example 6A | Example 9A |
|---|---|---|---|---|---|---|---|
| Formulation Appearance | hazy purple | sl. hazy purple | hazy purple | hazy purple | sl. hazy purple | sl. hazy purple | clear purple |
| Formulation Visc. (cps) | 2400 | 2300 | 2500 | 2400 | 2350 | 2300 | 7500 |
| Formulation Shelf Stab. | skin 1 day sl gel 3wk | skin 1 day modgel 3wk | skin 1 day no gel 3wk | skin 1 day sl gel 3wk | skin 1 day no gel 3wk | sl. skin no gel 3wk | skin 1 day no gel 3wk |
| Coating Thickness (mm) | .038 | .038 | .038 | .038 | .036 | .036 | .038 |
| Tack Free Time* (min) | 110/120 | 135/145 | 95/105 | 105/115 | 150/230 | 160/210 | 75/95 |
| Hardness 1 day | 6B− | <6B | <6B | <6B | <6B | <6B | <6B |
| 2–3 days | 3B | 4B | 2B | 3B | 3B | 2B | 5B–6B |
| 10 days | F− | F− | F− | F− | B | B | B− |
| 21 days | F | F-HB | F− | F− | HB+ | HB− | B |
| MEK rubs 2–3 days | 62 | 87 | 48 | 61 | 50 | 45 | 22 |
| 10 days | 200 | 200 | 120 | 160 | 95 | 75 | 40 |
| 21 days | 200 | 200 | 160 | 200 | 110 | 95 | 43 |
| Water Spot 3 days | ↓5B | ↓5B | ↓5B− | ↓5B | ↓4B | ↓4B | ↓6B |
| 10 days | ↓HB− | ↓HB− | ↓B | ↓B− | ↓3B | ↓2B | ↓4B |
| Forward Impact 21 days | 1.6 joules | 1.3 | 1.5 | 1.5 | 1.0 | 1.1 | 1.5 |
| QUV Durability 21 days | | | | | | | |
| 1 day exposure | dense PH B with fine UR over 75% of coating | dense PH B&UR over 85% of coating | dense PH B&UR in 2 patches (15% of coating) only | mod PH B with faint UR just starting | few PH B&UR just noted | few PH B&UR starting over most of coating | No Chg. |
| 2 day exposure | dense PH and #10B +R over 100% of coating | dense #10 B&PH R over 100% of coating | dense #10 B&R in 2 patches with PH B&R over rest of coating | dense PH B&R over 100% of coating | Dense #10 B&R over 100% of coating | Dense #10 B+ R over 100% of coating | Dense #10 B&R over 100% of coating |

\* = tack free, test A/test B
PH = pinhole
B = blistering
UR = under rust
R = rust

EXAMPLES, B-SERIES

Air-drying compositions are prepared from 80:20 blends of the unsaturated oil-modified resin of example 1A and the unsaturated melamine condensates of Examples 1–6 and 8. The compositions contain 0.07 percent cobalt naphthenate and 0.045 percent manganese octoate. Coatings are prepared by applying the compositions to Bonderite 37 steel panels and allowing them to air dry. Data for the evaluation of the coatings are presented in Table 3. Taken with the data for the A Series, they show that increasing the allyl level of the unsaturated melamine resin causes (a) a decrease in aminoplast and formulation viscosity, (b) a decrease in formulation shelf life, and (c) an improvement in compatibility of the unsaturated melamine condensate and the unsaturated vehicle. Increasing the acrylamide level of the UMF resin causes a decrease in coating tack free time and flexibility. Decreasing the allyl/acrylamide ratio causes the following properties to go through a maximum: rate of hardness development and final coating hardness, solvent resistance and QUV durability.

with Example 1B. Example 6C, containing the melamine acrylamide condensate shows decreased hardness in comparison with Example 6B and Example 8C containing the melamine allyl alcohol condensate shows a substantial increase in the time necessary to reach a tack

TABLE 3

| | Evaluation of Air-drying Unsaturated Compositions, B Series | | | | | | | |
|---|---|---|---|---|---|---|---|---|
| Sample Number | Ex. 1B | Ex. 2B | Ex. 3B | Ex. 4B | Ex. 5B | Ex. 6B | Ex. 8B | Ex. 9B |
| Formulation App. | hazy | sl. hazy | hazy | v. hazy | hazy | sl. hazy | clear | clear |
| Form. Visc. (cps) | 1,900 | 1,800 | 2,300 | 2,300 | 2,300 | 2,300 | 800 | 7,000 |
| Coating thick. (mm) | .033 | .033 | .033 | .036 | .033 | .028 | .028 | .033 |
| Tack Free Time (min) | 240/330 | 420/>600 | 180/330 | 225/340 | 170/300 | 250/450 | 400/>600 | 180/330 |
| Hardness 1 day | 4B | 5B | 6B | — | 6B | 5B | 6B-5B | 6B |
| 2 days | 3B | 3B-2B | 5B | 3B | 4B-5B | — | — | 6B |
| 4 days | HB | — | — | 2B | — | 3B | 2B+ | 4B |
| 10 days | HB | HB— | B+ | B | HB— | B | HB | B— |
| 21 days | F | HB | B— | HB-F | HB | B | HB | B |
| MEK rubs 2 days | 25 | 24 | 21 | 20 | 21 | — | — | 17 |
| 4 days | 35 | — | — | 30 | — | 16 | 35 | 22 |
| 10 days | 70 | 46 | 56 | 50 | 44 | 20 | 45 | 32 |
| 21 days | 120 | 95 | 95 | 60 | 83 | 37 | 65 | 48 |
| Water Spot 21 days | B | B | 2B+ | 4B | B. | — | — | 3B— |
| For. Impact 21 days | 1.7 | 1.6 | 1.6 | 1.4 | 1.8 | 1.1 | 1.6 | 1.8 |
| QUV Durab. 21 days | | | | | | | | |
| 1 day Exposure | Yellow | Yellow | Yellow | Yellow UR just starting | Yellow sl. UR | Sl. Yellow | Med. #10B +UR over 100% of coating | No chg. |
| 2 day Exposure | Dense #10 B&UR in 3 areas over 10% of coating | Dense #10 B&UR in 4 areas over 15% of coating | Dense #10 B&UR over 15% of coating | Dull UR over 85% of coating | Dense #10 B&UR over 20% of coating | Dense #10 B&UR over 80% of coating | | Dense #10 B&UR over 25% of coating |
| 4 day Exposure | Dense #9 B&R in 15% of coating | Similar to 2 days; 20% of coating affected | Dense PH +#10B+ R over 35% of coating | Dense #10 B&R over 100% of coating | B+R+ UR over 25% of coating | Dense #10 +#9B+ R over 100% of coating | | Dense #10 B&R over 75% of coating | free condition.

TABLE 4

| Sample Number | Example 1B | Example 1C | Example 6B | Example 6C | Example 8B | Example 8C | Example 9B |
|---|---|---|---|---|---|---|---|
| Formulation App. | hazy | clear | sl. hazy | sl. hazy | clear | clear | clear |
| Viscosity, cps | 1900 | 950 | 2300 | 1000 | 800 | 250 | 7000 |
| Coating Thickness (mm) | .030 | .033 | .028 | .033 | .028 | .028 | .029 |
| Tack free time (min) | 270/300 | 285/360 | 270/480 | 285/480 | 390/>600 | >600/>24 hr | 240/360 |
| Hardness 1 day | 2B | 3B | 5B | 5B | 5B | 5B | 5B |
| 4 days | HB | HB | 3B | 4B | 2B | 2B | 2B |
| 12 days | HB | HB | B | 3B | HB | HB | B |
| 21 days | F | F | B | 3B | HB | HB | B |
| MEK rubs 4 days | 30 | 40 | 16 | 14 | 35 | 33 | 22 |
| 12 days | 80 | 125 | 20 | 19 | 45 | 60 | 40 |
| 21 days | 115 | 160 | 37 | 37 | 65 | 67 | 55 |
| Impact resistance forward, joules | 1.6 | 1.3 | 1.1 | .9 | 1.6 | 1.6 | 1.5 |

EXAMPLES, C SERIES

Air-drying compositions similar to Examples 1B, 6B and 8B are prepared in which the weight ratio of oil-modified unsaturated resin to unsaturated melamine condensate is 65:35. Coatings are prepared by applying the compositions to Bonderite 37 steel panels and allowing them to air-dry. Data for the evaluation of the coatings are presented in Table 4. They show that the compositions containing high levels of melamine condensate are substantially lower in viscosity than the unsaturated resin of example 9B. However, only the unsaturated melamine condensate containing allyl and acrylamide units (Examples 1B, 1C) gives a significant improvement in hardness and solvent resistance without impairment in tack free time or impact resistance. Indeed Example 1C shows further improvement in solvent resistance and hence crosslink density in comparison

EXAMPLE 10

An air-drying composition of 70 percent solids is prepared from a solution of an unsaturated oil-modified resin of oil length 32% sold by Cargill under the tradename Alkyd 5700 and the unsaturated melamine condensate of example 1 in a weight ratio of solids of 80:20. The composition contains 0.07 percent cobalt neodecanoate and 0.03 percent LTD drier. The composition is coated on Bonderite 37 steel panels and allowed to air-dry. The coating is evaluated in comparison with a coating prepared from the alkyd resin alone (Example 11). The data are set forth in Table 5. Again the melamine-acrylamide-allyl alcohol condensate in Example 10 improves the coating hardness, solvent resistance and water resistance without adverse effect on the tack free time and the impact resistance.

TABLE 5

| Sample Number | Example 10 | Example 11 |
|---|---|---|
| Compatibility | clear red-orange | clear orange |
| Viscosity | 420 cps | 450 cps |
| | thin skin 5d. | |
| Pot. life Viscosity @ 21 days R.T. | 480 cps | 450 cps |
| Thickness mm. | 0.028–.036 | 0.030–0.033 |
| Appearance | Hi gloss colorless | Hi gloss colorless |
| Tack Free Time mins. (touch/Al foil) | 275/375 | 225/490 |
| Hardness 0.038 mm. | | |
| (1 day) | <<6B | <<6B |
| (4 days) | 3B | <6B |
| (5 days) | HB | 4B |
| (11 days) | HB-F | 4B |
| (21 days) | HB-F | 4B-5B |
| MEK rubs (4 days) | 36 | 16 |
| (11 days) | 63 | 19 |
| (21 days) | 70 | 17 |
| Water Spot (5 days) | ↓B-2B | ↓6B |
| (11 days) | ↓2B+ | ↓6B |
| Forward Impact (21 days), joules | 1.2 | 1.2 |

What is claimed is:

1. An air-drying composition comprising from about 50 to about 90 parts by weight of an unsaturated oil-modified resin and from about 50 to about 10 parts by weight of an unsaturated stepwise condensate of an alkoxymethylmelamine, an allylic alcohol, and an acrylamide, wherein the ratio of allylic alcohol moieties to acrylamide moieties in the condensate is in the range of about 3:1 to about 1:3, wherein the condensate contains at least about 0.75 allylic moiety and no more than about 3 acrylamide moieties per melamine ring and wherein the total of allylic moieties and acrylamide moieties of the condensate is in the range of about 2 to about 4 per melamine ring.

2. The air-drying composition of claim 1 wherein the unsaturated oil-modified resin is selected from the group consisting of oil-modified alkyd resins, oil-modified styrene allyl alcohol copolymers, oil-modified acrylic resins and oil-modified epoxy resins of number average molecular weight up to about 10,000 and glass transition temperature in the range of about 0° to about 100° C., having an oil length in the range of about 15 to about 50%.

3. The air-drying composition of claim 2 wherein the number average molecular weight of the unsaturated oil-modified resin is in the range of about 500 to about 8000 and the glass transition temperature is in the range of about 20° about 60° C.

4. The air-drying composition of claim 3 wherein the unsaturated oil-modified resin is an oil modified alkyd.

5. The air-drying composition of claim 1, 2, 3 or 4 wherein the alkoxymethylmelamine is a methoxymethylmelamine.

6. The air-drying composition of claim 1, 2, 3 or 4 wherein the allylic alcohol is allyl alcohol or methallyl alcohol and wherein the acrylamide is represented by the formula:

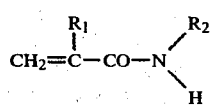

wherein $R_1$ and $R_2$ are selected from the group consisting of hydrogen and methyl.

7. The air-drying composition of claim 6, wherein the alkoxymethylmelamine is a methoxymethylmelamine.

8. The air-dring composition of claim 1, 2, 3 or 4 wherein the allylic alcohol is allyl alcohol and the acrylamide is acrylamide.

9. The air-drying composition of claim 8 wherein the alkoxymethylmelamine is a methoxymethylmelamine.

10. An air-drying composition comprising from about 70 to about 90 parts by weight of an unsaturated oil-modified resin and from about 30 to about 10 parts by weight of an unsaturated stepwise condensate of an alkoxymethylmelamine, allyl alcohol and acrylamide wherein the number of allyl moieties in the condensate is in the range of about 1 to about 3 per melamine ring and wherein the number of acrylamide moieties is in the range of about 1 to about 2 per melamine ring.

11. The air-drying alkyd composition of claim 10 wherein the alkoxymethylmelamine is a methoxymethylmelamine.

12. An air-drying composition comprising from about 70 to about 90 parts by weight of an unsaturated oil-modified resin and from about 30 to about 10 parts by weight of an unsaturated stepwise condensate of a methoxymethylmelamine, allyl alcohol, and acrylamide, wherein the number of allyl moieties in the condensate is in the range of about 1.5 to about 2.5 per melamine ring and wherein the number of acrylamide moieties is in the range of about 1 to about 2 per melamine ring.

13. The air-drying composition of claim 12 wherein the alkoxymethylmelamine is a methoxymethylmelamine.

14. The air-drying composition of claim 10, 11, 12 or 13 wherein the unsaturated oil-modified resin is selected from the group consisting of oil-modified alkyd resins, oil-modified styrene allyl alcohol copolymers, oil-modified acrylic resins and oil-modified epoxy resins of number average molecular weight up to about 10,000 and glass transition temperature in the range of about 0° to about 100° C., having an oil length in the range of about 15 to about 50%.

15. The air-drying composition of claim 14 wherein the number average molecular weight of the unsaturated oil-modified resin is in the range of about 500 to about 8000 and the glass transition temperature is in the range of about 20° to about 60° C.

16. The air-drying composition of claim 15 wherein the unsaturated oil-modified resin is an oil modified alkyd.

17. An article coated with the air-drying composition of claim 1, 2, 3, 4, 10, 11, 12 or 13.

18. An article coated with the air-drying composition of claim 5.

19. An article coated with the air-drying composition of claim 6.

20. An article coated with the air-drying composition of claim 7.

21. An article coated with the air-drying composition of claim 8.

22. An article coated with the air-drying composition of claim 9.

23. An article coated with the air-drying composition of claim 14.

24. An article coated with the air-drying composition of claim 15.

25. An article coated with the air-drying composition of claim 16.

* * * * *